United States Patent
Tanimoto (10) Patent No.: US 7,382,478 B2
(45) Date of Patent: Jun. 3, 2008

(54) INTERNET FACSIMILE MACHINE

(75) Inventor: Yoshifumi Tanimoto, Hirakata (JP)

(73) Assignee: Murata Kikai Kabushiki, Kyoto (JP)

( * ) Notice: Subject to any disclaimer, the term of this patent is extended or adjusted under 35 U.S.C. 154(b) by 1054 days.

(21) Appl. No.: 10/330,985

(22) Filed: Dec. 27, 2002

(65) Prior Publication Data

US 2003/0128402 A1 Jul. 10, 2003

(30) Foreign Application Priority Data

Dec. 28, 2001 (JP) .............................. 2001-400978
Dec. 28, 2001 (JP) .............................. 2001-401002

(51) Int. Cl.
G06K 1/00 (2006.01)
H04N 1/00 (2006.01)

(52) U.S. Cl. ..................... 358/1.15; 358/402; 358/407; 358/434

(58) Field of Classification Search ............... 358/1.15, 358/402, 407, 434, 442, 440, 468; 379/100.09, 379/100.12; 709/238
See application file for complete search history.

(56) References Cited

U.S. PATENT DOCUMENTS 6,600,750 B1 * 7/2003 Joffe et al. .................. 370/401
6,700,674 B1 * 3/2004 Otsuka et al. ............. 358/1.15

FOREIGN PATENT DOCUMENTS

| JP | 10-098573 | * | 4/1998 |
| JP | 10-107944 |   | 4/1998 |
| JP | 10-293734 | * | 11/1998 |
| JP | 2000-347954 |   | 12/2000 |

* cited by examiner

Primary Examiner—Houshang Safaipour
(74) Attorney, Agent, or Firm—Hogan & Hartson LLP (57) ABSTRACT

A full-mode Internet facsimile machine includes a transmitter transmitting image data by using an electronic mail message after storing original image data in a storage unit, a designating device declaring and designating an effective period when holding original image data in the storage unit as a transient effective period or a permanent effective period for each facsimile communication or for each destination, and a control unit controlling to hold the original image data in the storage unit during the designated effective period.

1 Claim, 10 Drawing Sheets

INTERNET FACSIMILE MACHINE

FIELD OF THE INVENTION

The present invention relates to a full-mode Internet facsimile machine that transmits an image data by using electronic mail.

DESCRIPTION OF THE RELATED ART

Figure 2:
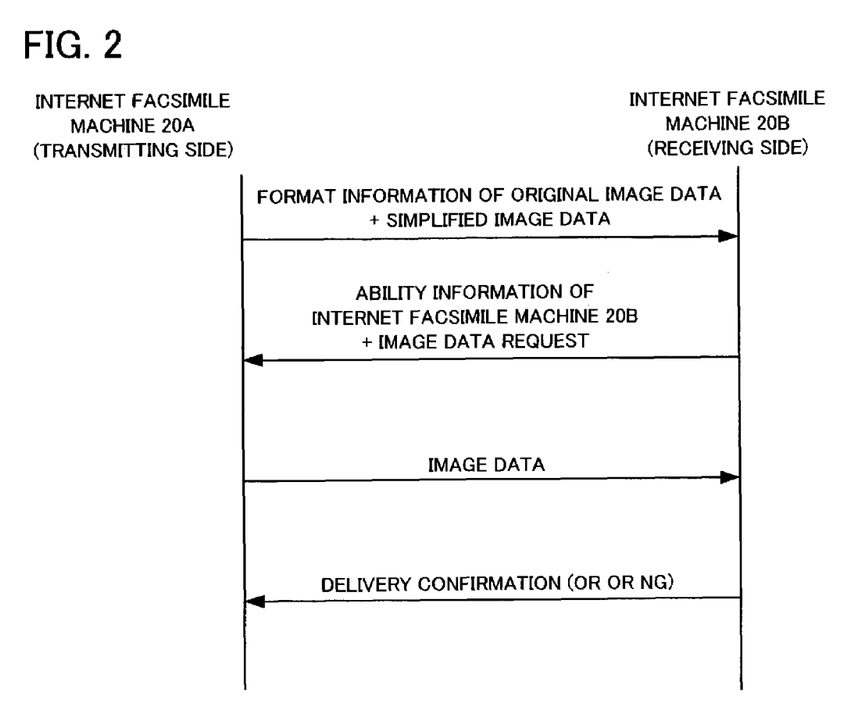
FIG. 2 is a sequence diagram showing a communication procedure between a full-mode Internet facsimile machine 20A and a full-mode Internet facsimile machine 20B of the related art.

FIG. 2 is a sequence diagram showing a communication procedure between full-mode Internet facsimile machines 20A, 20B of a related art.

In the full-mode Internet facsimile machine that transmits image data by using electronic mail via the Internet, as shown in FIG. 2, the transmitting Internet facsimile machine 20A scans a document image under its maximum ability condition or under an ability condition designated by a user. Then, Internet facsimile machine 20A stores the scanned document image in an image memory as an original image data, and forms a simplified image data with a resolution lower than that of the original image data. Next, Internet facsimile machine 20A transmits a first electronic mail message including the simplified image data and format information of the original image data, to receiving Internet facsimile machine 20B via the Internet. In response to the first electronic mail message from Internet facsimile machine 20A, Internet facsimile machine 20B returns an electronic mail message including its ability information (information such as a file format of the image data, a processable resolution and its horizontal to vertical ratio, an image encoding method, and information of the width of the printing paper size) and an image data request to Internet facsimile machine 20A via the Internet.

Then, Internet facsimile machine 20A forms image data corresponding to the ability information from the original image data stored in the image memory, in accordance with the received ability information of facsimile machine 20B. In addition, Internet facsimile machine 20A transmits an electronic mail message including the image data to Internet facsimile machine 20B via the Internet. In response to the electronic mail message from Internet facsimile machine 20A, when receiving the electronic mail message normally, Internet facsimile machine 20B returns an electronic mail message including a delivery confirmation of "OK" to Internet facsimile machine 20A. Moreover, when receiving the electronic mail message abnormally, Internet facsimile machine 20B returns an electronic mail message including a delivery confirmation of "NG" to Internet facsimile machine 20A.

In the above-described communication procedure for the full-mode Internet facsimile, it is necessary for the Internet facsimile machine 20A to store the original image data in the image memory until receiving the electronic mail message including the ability information of the Internet facsimile machine 20B and the image data request. However, when a storage period becomes long, a storage field of the image memory is pressured, which affects other communications (first problem).

Moreover, it is necessary for the transmitting Internet facsimile machine to hold the original image data in the image memory until the image data request arrives. Therefore, when transmitting the simplified image data at first, an effective period when holding the original image data (hereinafter referred to as the "original image data holding effective period") can be declared and designated as either transient or permanent (hereinafter, the former will be referred to as the "transient effective period", and the latter will be referred to as the "permanent effective period). This was prepared in consideration to a transmission from an Internet facsimile machine having low memory capacity. However, the Internet facsimile machine could only selectively designate from the two choices (second problem).

In addition, in the above-described Internet facsimile machine, there are cases when the image data being held is erased, for example, due to power failure of a power source of the Internet facsimile machine (third problem).

Moreover, as described above, in the transmitting Internet facsimile machine when transmitting the simplified image data at first, an effective period when holding the original image data can be declared and designated as either transient or permanent. This was prepared in consideration to a transmission from an Internet facsimile machine having low memory capacity. However, the image memory that holds the original image data was used only for holding the image data, and the image memory was not used effectively according to the effective period (fourth problem).

SUMMARY OF THE INVENTION

A first advantage of the present invention is to solve the above first and second problems, and to provide an Internet facsimile machine that can change the original image data holding effective period when storing the original image data in the image memory, more flexibly and according to the circumstance compared to the related art.

A second advantage of the present invention is to solve the above fourth problem, and to provide an Internet facsimile machine that can effectively use an image memory that stores the original image data according to the original image data holding effective period.

A third advantage of the present invention is to solve the above third problem, and to provide an Internet facsimile machine that can execute an appropriate processing to the original image data stored in the image memory when a power source of the Internet facsimile machine recovers after a power failure.

According to the first advantage, the Internet facsimile machine of the present invention is a full-mode Internet facsimile machine that stores the original image data in a storage unit, and transmits an image data via electronic mail. The Internet facsimile machine includes a designating device and a control unit. Further, the designating device declares and designates the effective period when holding the original image data in the storage unit as the transient effective period or as the permanent effective period for each facsimile communication or for each destination. The control unit controls to hold the original image data in the storage unit during the designated effective period. Therefore, the effective period when holding the original image data can be declared and designated for each facsimile communication or for each destination according to a circumstance, and the effective period can be changed flexibly compared to the related art.

According to the first advantage, the Internet facsimile machine according to the present invention is a full-mode Internet facsimile machine that stores an original image data in a storage unit and transmits an image data via electronic mail. The Internet facsimile machine includes a designating device and a control unit. Further, the designating device declares and designates an effective period when holding the original image data in the storage unit as the transient effective period or the permanent effective period in accordance with a state of a hardware source of the Internet facsimile machine or a time zone when transmitting the image data. The control unit controls to hold the original image data in the storage unit during the designated effective period. The state of the hardware source is preferable to be an available size of the storage unit, or the traffic of the communication network. Therefore, a transmission corresponding more to the state of the Internet facsimile machine can be carried out. Alternatively, the user can set a most appropriate period of time for the original image data holding effective period. The original image data holding effective period can be set according to the needs of the user, and the operationality of the Internet facsimile machine can be improved.

Moreover, the Internet facsimile machine also includes a changing device changing a time value of the transient effective period or a time value of the permanent effective period. Therefore, the user can set a most appropriate period of time for the original image data holding effective period. In addition, the original image data holding effective period can be set according to the needs of the user, and the operationality of the Internet facsimile machine can be improved.

According to the second advantage, the Internet facsimile machine of the present invention is a full-mode Internet facsimile machine that stores an original image data in a nonvolatile storage unit, and transmits an image data via electronic mail. The Internet facsimile machine includes a designating device and a control unit. Further, the designating device declares and designates the effective period when holding the original image data. The control unit controls to transfer the original image data stored in the nonvolatile storage unit and to store the original image data in a volatile storage unit. Therefore, according to the original image data holding effective period, the image memory for holding the original image data can be used effectively for the nonvolatile storage unit and the volatile storage unit.

According to the third advantage, the Internet facsimile machine of the present invention is a full-mode Internet facsimile machine that stores an original image data in a volatile storage unit that is backed-up by a battery, and transmits the image data by using electronic mail. The Internet facsimile machine includes a control unit controlling to execute a transmission error processing including a processing to delete the original image data stored in the volatile storage unit when a power source of the Internet facsimile machine recovers after a power failure. Therefore, when the power source of the Internet facsimile machine recovers after the power failure, considering a case in which the stored data is no longer accurate data due to an abnormality in the memory data or the like, the transmission error processing including a processing to delete the unnecessary original image data stored in the volatile storage unit is executed. Therefore, even when the power source of the Internet facsimile machine recovers after the power failure, an appropriate processing can be executed for the original image data stored in the image memory.

According to the second advantage, the Internet facsimile machine of the present invention is a full-mode Internet facsimile machine that stores an original image data in a storage device, and transmits an image data via electronic mail. The Internet facsimile machine includes a designating device and a control unit. Further, the designating device declares and designates the effective period for holding the original image data as the transient effective period or the permanent effective period. When the designated effective period is the transient effective period, the control unit controls to store the original image data in a volatile storage unit. Meanwhile, when the designated effective period is the permanent effective period, the control unit controls to store the original image data in a nonvolatile storage unit. Therefore, according to the original image data holding effective period, the image memory for holding the original image data can be used effectively for the nonvolatile storage unit and the volatile storage unit.

According to the second advantage, the Internet facsimile machine of the present invention is a full-mode Internet facsimile machine that stores an original image data in a volatile storage unit, and transmits an image data via electronic mail. The Internet facsimile machine includes a designating device and a control unit. Further, the designating device declares and designates the effective period for holding the original image data as the transient effective period or the permanent effective period. When the designated effective period is the transient effective period, the control unit controls to store the original image data in a field in the volatile storage unit that is not backed-up by a battery. When the designated effective period is the permanent effective period, the control unit controls to store the original image data in a field in the volatile storage unit that is backed-up by a battery. Therefore, according to the original image data holding effective period, the image memory for holding the original image data can be used effectively for a field in the volatile storage device that is backed-up by a battery, and a field in the volatile storage device that is not backed-up by a battery.

DETAILED DESCRIPTION OF THE PREFERRED EMBODIMENTS

Embodiments of the present invention will be described with reference to the accompanying drawings.

First Embodiment

Figure 1:
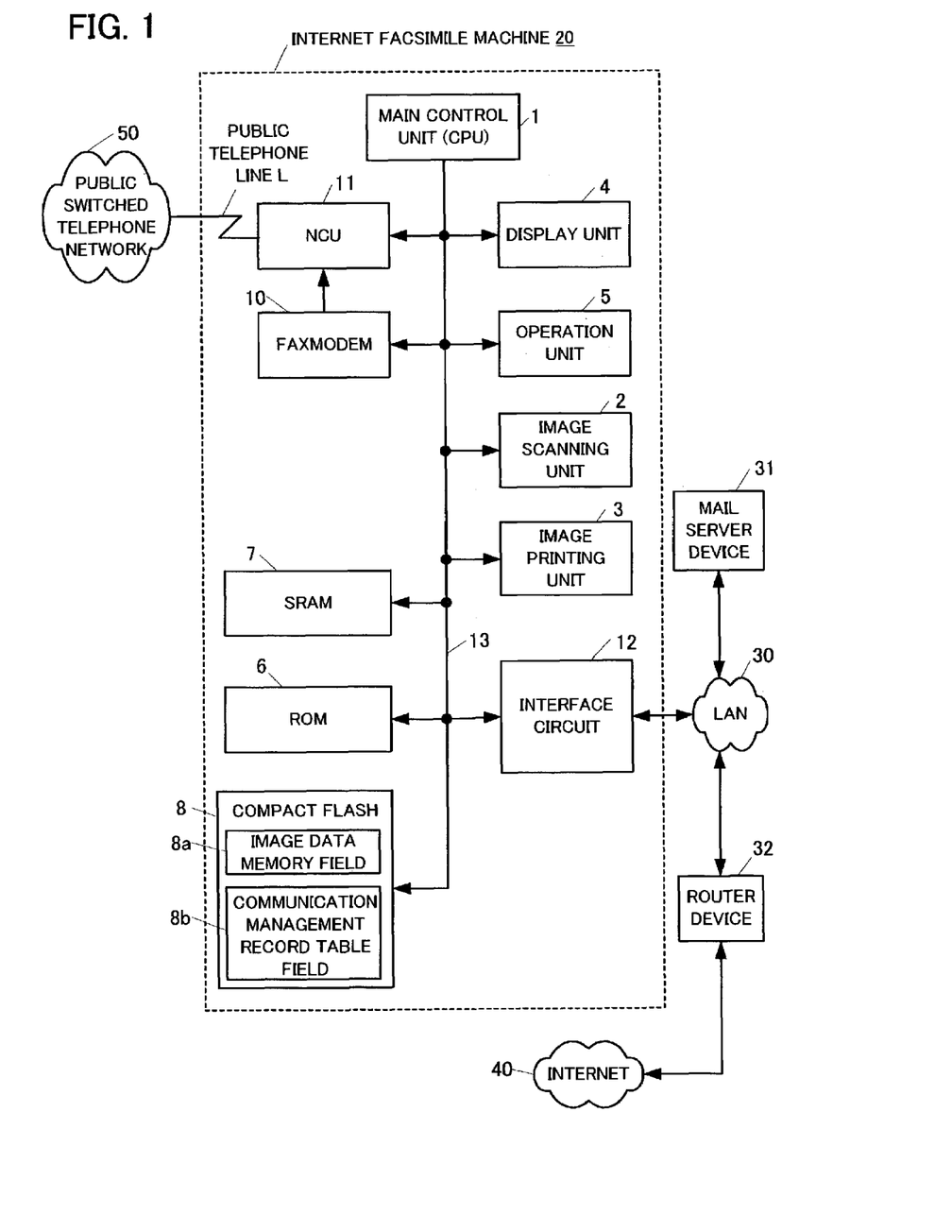
FIG. 1 is a block diagram showing a configuration of an Internet facsimile machine 20 according to first and second embodiments of the present invention.

FIG. 1 is a block diagram showing a configuration of an Internet facsimile machine 20 according to an embodiment of the present invention.

The Internet facsimile machine 20 of the first embodiment is a full-mode Internet facsimile machine that stores an original image data in an image data memory field 8a in a memory device 8 such as a CompactFlash memory device (CompactFlash is a registered trademark of SanDisk Corp. of Santa Clara, Calif.), and transmits image data via Internet 40 using electronic mail. A setting for whether or not to include an original image data holding effective period designating mode can be set for each communication or for each destination. This information is stored in a prescribed field in the memory device 8. A control unit 1 controls to hold the original image data in the image data memory field 8a in the memory device 8 during the designated effective period. When the user puts on the original image data holding effective period designating mode by using an operation unit 5, a "transient effective period" having a default time value or a time value changed by the operation unit 5 is declared and designated. Meanwhile, when the user removes the original image data holding effective period designating mode, a "permanent effective period" having a limitless time value as long as a memory of the memory device 8 exists physically and functions are declared and designated.

In FIG. 1, the Internet facsimile machine 20 includes a facsimile communication function of a conventional G3 method or the like, and a full-mode Internet facsimile function having the communication procedure of FIG. 2. The main control unit 1 is formed of a CPU (Central Processing Unit) specifically. The main control unit 1 is connected to each of the following hardware parts via a bus 13, and controls the hardware parts. In addition, the main control unit 1 executes various functions of software to be described later on. An image scanning unit 2 scans a document by a scanner using CCD (Charged Coupled Device) or the like, and outputs a dotted image data converted into a binary of black and white. An image printing unit 3 is an electro-photographic typed printer or the like, and prints, out to record the image data, which is received by the facsimile communication from another facsimile machine, as a hard copy. A display 4 is a displaying device such as a liquid crystal display (LCD) or CRT (Cathode Ray Tube) display. The display 4 displays an operation status of the Internet facsimile machine 20, or displays an image data of the document to be transmitted, and a received image data.

The operation unit 5 includes letter keys, ten-key numeric pad for dialing, speed-dial keys, one-touch dial keys, various function keys or the like that are necessary for operating the Internet facsimile machine 20. Further, by forming the display 4 as a touch panel, a part or all of the various keys in the operation unit 5 can be substituted.

ROM (Read Only Memory) 6 stores various software programs that are necessary for an operation of the Internet facsimile machine 20 and that are executed by the main control unit 1. The programs include at least a program of a full-mode Internet facsimile transmission processing shown in FIG. 3 through FIG. 6. Moreover, the programs can be recorded in a recording medium such as a floppy disk, MO (Magneto-Optic) disk, or DVD-RAM (Digital Versatile Disk-Random Access Memory). The programs can be loaded to SRAM (Static Random Access Memory) 7 via the drive device when necessary, and the program can be executed. The SRAM 7 is used as a working area of the main control unit 1, and stores temporally data that generates when the program is executed. In addition, the memory device 8 includes the image data memory field 8a that stores the image data, and a communication management record table field 8b that is a memory field for recording a communication management record table.

A faxmodem 10 is a modem connected to a public switched telephone network (PSTN) 50 via a public telephone line L, and includes a faxmodem function for general facsimile communication. NCU (Network Control Unit) 11 is a hardware circuit that carries out closing and releasing operations of a direct current loop or the like of the analogue public telephone line L, and includes an automatic dial function. The NCU 11 connects the faxmodem 10 to the public telephone line L when necessary. Further, the NCU 11 can detect an ID receiving terminal starting signal of a caller ID notification service, and a general telephone calling signal. In addition, the NCU 11 can transmit a first response signal and a second response signal in the caller ID notification service when necessary. Moreover, the NCU 11 can be connected to a digital line (for example, ISDN (Integrated Services Digital Network) line) of a base band transmission method via a prescribed terminal adaptor and DSU (Digital Service Unit).

An interface circuit 12 is a LAN (Local Area Network) interface circuit that carries out a signal conversion or a protocol conversion of a signal or data to connect the Internet facsimile machine 20 to LAN 30 or the like such as an Ethernet. A mail server device 31 and a router device 32 are connected to the LAN 30. Furthermore, the router device 32 is connected to a mail server device of a destination (not shown in the drawings) via the Internet 40. When transmitting the electronic mail message to another Internet facsimile machine from the Internet facsimile machine 20 after attaching the image data to a main body of the electronic mail message, the electronic mail message is transmitted to the mail server device 31 once via the LAN 30 from the interface circuit 12. Then, the mail server device 31 transmits the Internet mail message to the receiving Internet facsimile machine via the LAN 30, the router device 32, the Internet 40, and the mail server device of the destination (not shown in the drawings). Meanwhile, when receiving an electronic mail message, the Internet facsimile machine 20 receives the electronic mail message through a path that is the reverse of the above-described path. Further, a line connection to the Internet 40 is not limited to a private line or the like, and can be a dial-up connection using the public telephone line L.

The Internet facsimile machine 20 of the first embodiment having the configuration as described above includes the facsimile communication function of the general G3 method, the Internet, or the like. The Internet facsimile machine 20 also includes an Internet facsimile function.

According to the facsimile communication function, the dotted image data scanned by the image scanning unit 2 is encoded by a software in accordance with an encoding method, such as MH (Modified Huffman), MR (Modified Read), or MMR (Modified Modified Read), encoding methods which are defined in a standard of the facsimile communication. Then, the encoded data is transmitted to the receiving facsimile machine. Meanwhile, the encoded data received from the receiving facsimile machine is decoded into image data by the software, and is output as a hardcopy from the image printing unit 3.

Next, an example of an electronic mail message will be described for the full-mode Internet facsimile transmission of the first embodiment.

First, an example of the electronic mail message for the transmission of the simplified image data is shown in Chart 1. As it is evident from Chart 1, format information of the attached image data (information such as a file format of the image data, a resolution and its horizontal to vertical ratio, an image encoding method, and information of the width of the printing paper size), and format information of the original image data (information such as a file format of the image data, a resolution and its horizontal to vertical ratio, an image encoding method, and information of the width of the printing paper size) are included above the inserted TIFF (Tagged Image File Format) image data. Moreover, in the eighth line of Chart 1, it is written "permanent", and this shows that the original image data holding effective period is "permanent".

CHART 1

An example of the electronic mail message for the transmission of the simplified image data
Date: Wed, 20 Sep 1995 00:18:00 +0900
From: Sender@terminalA.ifax
Message-Id: <199509200019.12345@terminalA.ifax>
Subject: Internet FAX Full Mode Sample1
To: Recipient@terminalB.ifax
Disposition-Notification-To: Sender@terminalA.ifax
Disposition-Notification-Options:
    Alternative-available=optional, permanent
MIME-Version: 1.0
Content-Type: multipart/mixed;
    boundary="RAA14128.773615765"
--RAA14128.773615765
Content-type: image/tiff, application=faxbw
Content-Transfer-Encoding: base64
Content-features:
    (&(color=Binary)
      (image-file-structure=TIFF-minimal)
      (dpi=200)
      (dpi-xyratio=1)
      (paper-size=A4)
      (image-coding=MH)
      (MRC-mode=0)
      (ua-media=stationery))
Content-alternative:
    (&(color=Binary)
      (image-file-structure=TIFF-limited)
      (dpi=400)
      (dpi-xyratio=1)
      (paper-size=A4)
      (image-coding=MMR)
      (MRC-mode=0)
      (ua-media=stationery))
[TIFF-FX Profile-S (Image Data)]
--RAA14128.773615765--

Next, an example of an electronic mail message for the transmission of the image data request (a response mail message to the electronic mail message for the transmission of the simplified image data of Chart 1) is shown in Chart 2. As it is evident from Chart 2, the ability information of the receiver (information such as a file format of the image data, a processable resolution and its horizontal to vertical ratio, an image encoding method, and information of the width of the printing paper size) is included at the end of the main body of the electronic mail message.

CHART 2

An example of the electronic mail message for the transmission of the image data request
Date: Wed, 20 Sep 1995 00:19:00 +0900
From: Recipient@terminalB.ifax
Message-Id: <199509200020.12345@terminalB.ifax>
Subject: Re: Internet Fax Full Mode Sample1
To: Sender@terminalA.ifax
MIME-Version: 1.0
Content-Type: multipart/report;
    report-type=disposition-notification;
    boundary="RAA14128.773615766"
--RAA14128.773615766
The message sent on 1995 Sep 20 at 00:18:00 +0900 to Recipient@terminalB.ifax with subject "Internet Fax Full Mode Sample1" has been received. An alternative form of the message data is requested.
-RAA14128.773615788
Content-Type: message/disposition-notification
Reporting-UA: Recipient terminalB.ifax;IFAX-FullMode
Original-Recipient: rfc822;Recipient@terminalB.ifax
Final-Recipient: rfc822;Recipient@terminalB.ifax
Original-Message-ID: <199509200019.12345@terminalA.ifax>
Disposition: automatic-action/MDN-sent-automatically;
    deleted/alternative-preferred
Media-Accept-Features:
    (&(color=Binary)
      (image-file-structure=TIFF)
      ( | (&(dpi=200)(dpi-xyratio=200/100))
        (&(dpi=200)(dpi-xyratio=1))
        (&(dpi=400)(dpi-xyratio=1)))
      ( | (image-coding=[MH,MR,MMR])
        (&(image-coding=JBIG)
          (image-coding-constraint=JBIG-T85)
          (JBIG-stripe-size=128)))
      (MRC-mode=0)
      (paper-size=[A4,B4])
      (ua-media=stationery))
--RAA14128.773615766--

Furthermore, an example of an electronic mail message for the second transmission of the image data (corresponding to the ability information of the receiver written in the image data request mail message of Chart 2) is shown in Chart 3. As it is evident from Chart 3, the converted TIFF image data is attached to the end of the electronic mail message.

CHART 3

An example of the electronic mail for the second transmission of the image data

Date: Wed, 20 Sep 1995 00:21:00 +0900
From: Sender@terminalA.ifax
Message-Id: <199509200021.12345@terminalA.ifax>
Original-Message-Id: <199509200019.12345@terminalA.ifax>
Subject: Internet FAX Full Mode Sample2
To: Recipient@terminalB.ifax
Disposition-Notification-To: Sender@terminalA.ifax
MIME-Version: 1.0
Content-Type: multipart/mixed;
    boundary="RAA14128.773615768"
--RAA14128.773615768
Content-type: image/tiff, application=faxbw
Content-Transfer-Encoding: base64
[TIFF-FX Profile-F (Image Data)]
--RAA14128.773615768--

Furthermore, an example of an electronic mail message for the transmission of the delivery confirmation is shown in Chart 4. As it is evident from Chart 4, the delivery confirmation information is inserted at the head of the main body of the electronic mail message, and the ability information of the receiver (information such as a file format of the image data, a processable resolution and its horizontal to vertical ratio, an image encoding method, and information of the width of the printing paper size) is included at the end of the delivery confirmation information.

CHART 4

An example of the electronic mail message for the transmission of the delivery confirmation
Date: Wed, 20 Sep 1995 00:22:00 +0900
From: Recipient@terminalB.ifax
Message-Id: <199509200022.12345@terminalB.ifax>
Subject: Re; Internet FAX Full Mode Sample2
To: Sender@terminalA.ifax
MIME-Version: 1.0
Content-Type: multipart/report;
    report-type=disposition-notification;
    boundary="RAA14128.773615769"
--RAA14128.773615769
The message sent on 1995 Sep 20 at 00:21:00 +0900 to
Recipient@terminalB.ifax with subject "Internet FAX
Full Mode Sample2" has been processed in Internet FAX
Full Mode.
--RAA14128.773615769
Content-Type: message/dispostion-notification
Reporting-UA: Recipient,terminalB.ifax; IFAX-FullMode
Original-Recipient: rfc822;Recipient@terminalB.ifax
Final-Recipient: rfc822; Recipient@terminalB.ifax
Original-Message-ID: <1995092000021.12345@terminalA.ifax>
Disposition: automatic-action/MDN-sent-automatically;processed
Media-Accept-Features:
   (&(color=Binary)
     (image-file-structure=TIFF)
     ( | (&(dpi=200)(dpi-xyratio=200/100))
       (&(dpi=200)(dpi-xyratio=1))
       (&(dpi=400)(dpi-xyratio=1)))
     ( | (image-coding=[MH,MR,MMR])
       (&(image-coding=JBIG)
        (image-coding-constraint=JBIG-T85)
        (JBIG-stripe-size=128)))
     (MRC-mode=0)
     (paper-size=[A4,B4])
     (ua-media=stationery))
--RAA14128.773615769/terminalB.ifax--

According to the first embodiment, a setting for whether or not to include the original image data holding effective period designating mode can be set for each facsimile communication or for each destination. This information is stored in a prescribed field in the memory device 8. Then, the main control unit 1 controls to hold the original image data in the image data memory field 8a in the memory device 8 during the designated effective period. When the user activates the original image data holding effective period designating mode by using the operation unit 5, the "transient effective period" having a default time value (for example, 72 hours) or a time value change by the operation unit 5 is declared and designated. Meanwhile, when the user deactivates the original image data holding effective period designating mode, the "permanent effective period" having a limitless time value as long as the memory of the memory device 8 physically exists and functions are declared and designated. Further, the "transient effective period" can be changed by using the operation unit 5.

Figure 3:
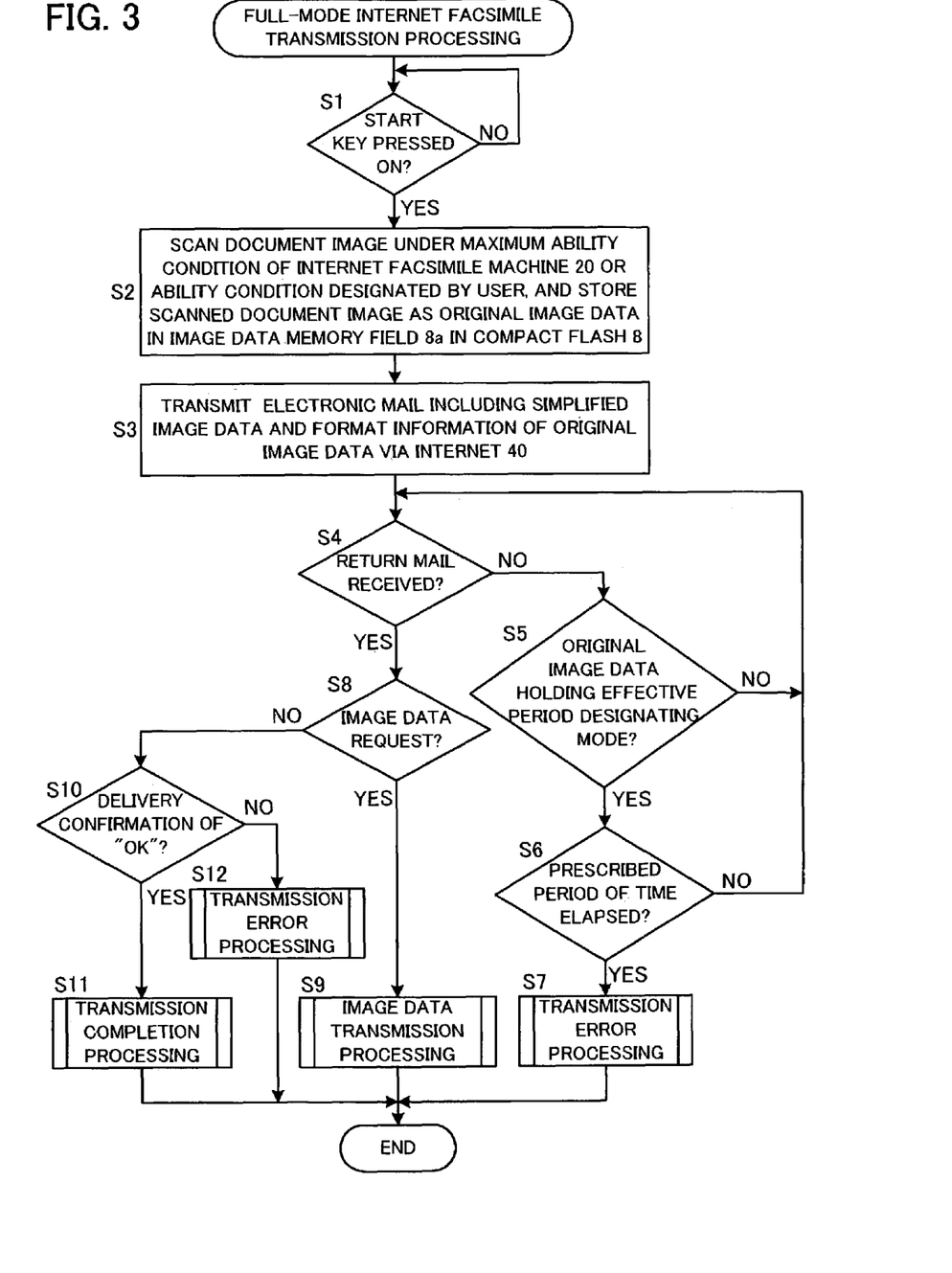
FIG. 3 is a flowchart showing a full-mode Internet facsimile transmission processing to be executed by a main control unit 1 of the Internet facsimile machine 20 of the first embodiment.

FIG. 3 is a flowchart showing the full-mode Internet facsimile transmission processing to be executed by the main control unit 1 of the Internet facsimile machine 20 of FIG. 1.

In step S1 of FIG. 3, first, it is determined whether or not a start key is pressed ON. Then, when it is determined YES, in step S2, a document image is scanned under the maximum ability condition of Internet facsimile machine 20 or under an ability condition designated by the user. In addition, the scanned document image is stored in the image data memory field 8a in the memory device 8 as an original image data. In step S3, the electronic mail message including the simplified image data and the format information of the original image data is transmitted to the receiving Internet facsimile machine via the Internet 40. Next, in step S4, it is determined whether or not a return mail message is received from the receiving Internet facsimile machine. When it is determined NO, the process proceeds to step S5. When it is determined YES, the process proceeds to step S8. In step S5, it is determined whether or not the original image data holding effective period designating mode is set. When it is determined NO, the process returns to step S4. When it is determined YES, the process proceeds to step S6. Next, in step S6, it is determined whether or not only a time value (for example, 72 hours) of the preset "transient effective period" has elapsed. When it is determined NO, the process returns to step S4. When it is determined YES, the process proceeds to step S7. In step S7, the transmission error processing of FIG. 4 is executed, and the Internet facsimile transmission processing ends.

Figure 5:
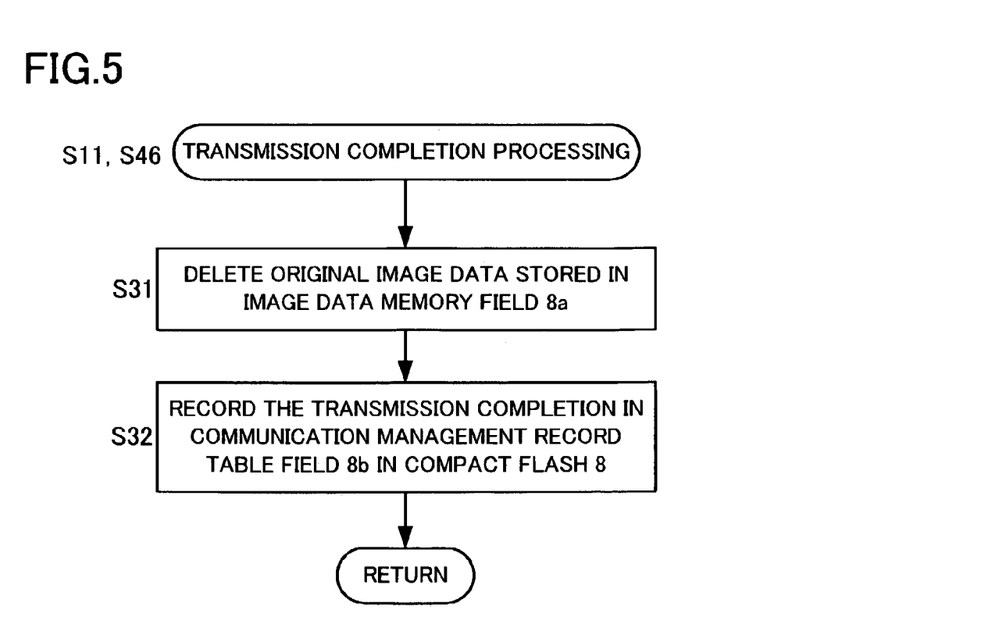
FIG. 5 is a flowchart showing a transmission completion processing (S11, S46) which is a subroutine of FIG. 3 and FIG. 6.
Figure 6:
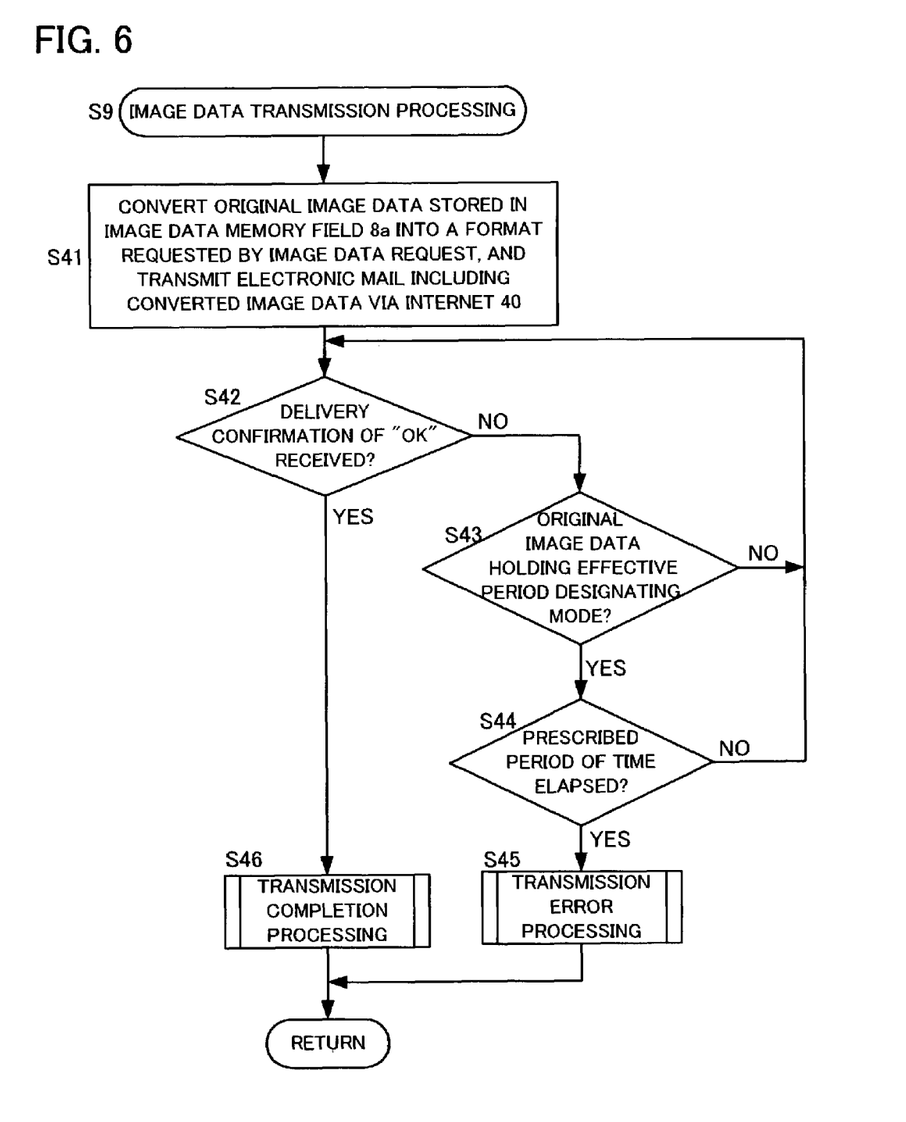
FIG. 6 is a flowchart showing an image data transmission processing (S9) which is a subroutine of FIG. 3.

Moreover, in step S8, it is determined whether or not it is the image data requested. When it is determined YES, the process proceeds to step S9. When it is determined NO, the process proceeds to step S10. In step S9, the image data transmission processing of FIG. 6 is executed, and the Internet facsimile transmission processing ends. Meanwhile, in step S10, it is determined whether or not the return mail message is the delivery confirmation of "OK". When it is determined YES, the process proceeds to step S11. When it is determined NO, the process proceeds to step S12. In step S11, the transmission completion processing of FIG. 5 is executed, and the Internet facsimile transmission processing ends. Meanwhile, in step S12, the transmission error processing of FIG. 4 is executed, and the Internet facsimile transmission processing ends.

Figure 4:
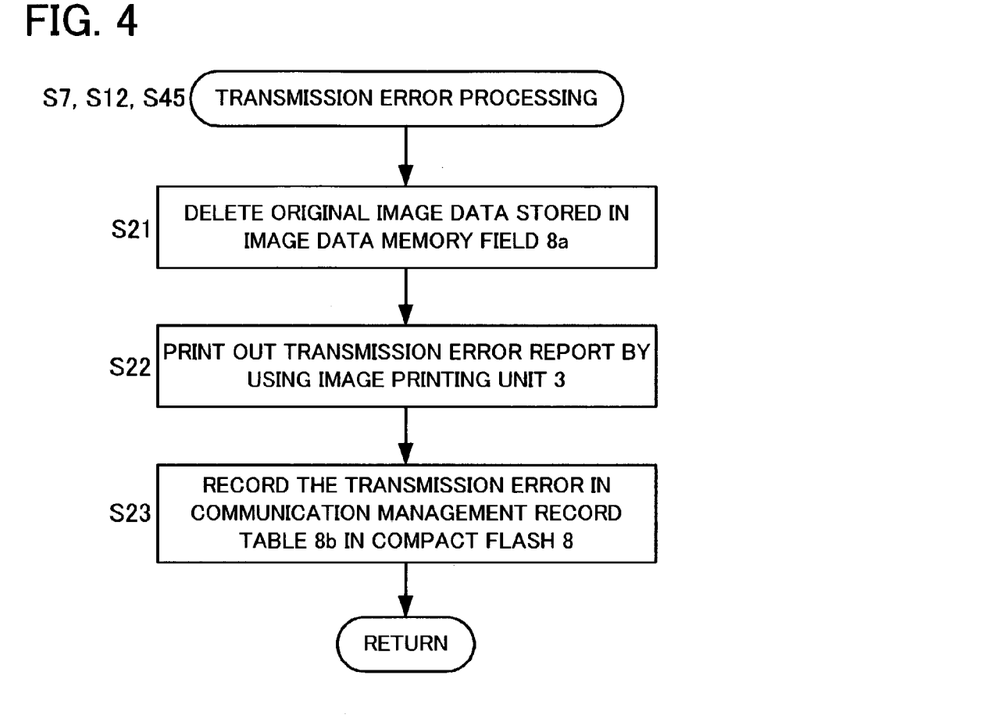
FIG. 4 is a flowchart showing a transmission error processing (S7, S12, S45) which is a subroutine of FIG. 3 and FIG. 6.

FIG. 4 is a flowchart showing the transmission error processing (S7, S12, S45) which is a subroutine of FIG. 3 and FIG. 6.

In step S21 of FIG. 4, the original image data stored in the image data memory field 8a is deleted. Then, in step S22, when the return mail message cannot be received from the receiver, or when receiving the delivery confirmation of "NG", as described above, the transmission error report notifying the fact that the original image data has been deleted is printed out by using the image printing unit 3. In step S23, the transmission error is recorded in the communication management record table field 8b in the memory device 8, and the process returns to the original main routine.

FIG. 5 is a flowchart showing the transmission completion processing (S11, S46) which is a subroutine of FIG. 3 and FIG. 6.

In step S31 of FIG. 5, first, the original image data stored in the image data memory field 8a is deleted. Then, in step S32, the transmission completion is recorded in the communication management record table field 8b in the memory device 8, and the process returns to the original main routine.

FIG. 6 is a flowchart showing the image data transmission processing (S9) which is a subroutine of FIG. 3.

In step S41 of FIG. 6, first, the original image data stored in the image data memory field 8a is converted into a format requested by the image data request. Then, the electronic mail message including the converted image data is transmitted to the receiving Internet facsimile machine via the Internet 40. In step S42, it is determined whether or not the delivery confirmation of "OK" is received. When it is determined NO, the process proceeds to step S43. When it is determined YES, the process proceeds to step S46. In step S43, it is determined whether or not the original image data holding effective period designating mode is set. When it is determined NO, the process returns to step S42. When it is determined YES, the process proceeds to step S44. In step S44, it is determined whether or not the preset time value of the "transient effective period" (for example, 72 hours) has elapsed. When it is determined NO, the process returns to step S42. When it is determined YES, the process proceeds to step S45. In step S45, the transmission error processing of FIG. 4 is executed, and the process returns to the original main routine. Meanwhile, in step S46, the transmission completion processing of FIG. 5 is executed, and the process returns to the original main routine.

The full-mode Internet facsimile machine transmits the simplified image data accompanying the information of the original document at first. Then, when there is a request from the destination, the full-mode Internet facsimile machine transmits the image corresponding to the ability of the destination. However, since it is necessary for the transmitting Internet facsimile machine to hold the original image data during this period, when transmitting the simplified image data at first, the effective period of the original image data can be designated to be "transient" or "permanent". This is prepared in consideration to carry out the transmission from an Internet facsimile machine having low memory capacity. Even when the effective period is temporally, the appropriate length for the effective period is influenced by an environment or the like where the Internet facsimile machine is provided. Moreover, there are cases when the image is preferable to be transmitted to the receiving machine under high image quality according to the contents of the document to be transmitted, regardless of the ability of the machine. Therefore, according to the first embodiment, the following processing is carried out.

(1) In the transmitting Internet facsimile machine 20, the user can declare and designate the original image data holding effective period as "transient effective period" or "permanent effective period" for each facsimile communication, and the transmission corresponding more to an intension of the user can be carried out.

(2) In the Internet facsimile machine 20 the user can declare and designate the original image data holding effective period as "transient effective period" or "permanent effective period" for each destination, and the transmission corresponding more to an intension of the user can be carried out.

(3) The user can set the time value of the effective period of when declaring as the "transient effective period" by using the operation unit 5, and the most appropriate time can be set.

As described above, according to the first embodiment, the determination for whether or not to activate the original image data holding effective period designating mode, in other words, to declare and designate either the "transient effective period" or the "permanent effective period" can be set for each facsimile communication or for each destination. This information is stored within the prescribed field in the memory device 8. The main control unit 1 controls to hold the original image data in the image data memory field 8a in the memory device 8 during the designated effective period. Therefore, the effective period when holding the original image data can be declared and designated for each facsimile communication or for each destination, according to the circumstance. In addition, the effective period can be changed flexibly compared to the related art.

Moreover, the time value of the "transient effective period" can be changed by using the operation unit 5. Therefore, the effective period when holding the original image data can be changed flexibly, according to the circumstance compared to the related art.

Variation of First Embodiment

In the above-described first embodiment, an example of the Internet facsimile machine 20 is described. However, the present invention is not limited to this example, and for example, the present invention can be applied to a communication terminal device including a telephone set, a data communication device or the like, that is connected to a public network, such as a public switched telephone network or a public digital line network.

In the first embodiment, the original image data holding effective period can be declared and designated automatically as the "transient effective period" or the "permanent effective period" according to the state of the hardware source of the Internet facsimile machine, or according to the time zone when transmitting the image data. The state of the hardware source of the former is an available size of the image data memory field 8a in the memory device 8 or a traffic of the communication network (specifically, for example, a traffic of the communication frequency of the public telephone line L, or a traffic from the router device 32 to the Internet 40). By forming the Internet facsimile machine in the above-described way, the transmission corresponding more to the state of the Internet facsimile machine can be carried out. Alternatively, the user can set a most appropriate period of time for the original image data holding effective period. In addition, the original image data holding effective period can be set according to the needs of the user, and the operationality of the Internet facsimile machine can be improved.

According to the first embodiment, the "permanent effective period" has a limitless time value. However, the present invention is not limited to this example, and for example, the "permanent effective period" can have a default time value or a prescribed time value changed by using the operation unit 5. Moreover, a boundary threshold between the time value of the "transient effective period" and the time value of the "permanent effective period" can be set. Then, when the user inputs a random time value of the effective period, the "transient effective period" or the "permanent effective period" can be declared and designated according to the input time value. For example, when the boundary threshold is set at 72 hours, in the case the user inputs the effective period of 24 hours by using the operation unit 5, the "transient effective period" is set as the original image data holding effective period. Meanwhile, when the boundary threshold is set at 72 hours, in the case the user inputs the effective period of 75 hours by using the operation unit 5, the "permanent effective period" is set as the original image data holding effective period. Therefore, the user can set the most appropriate period of time for the original image data holding effective period. In addition, the original image data holding effective period can be set according to the needs of the user, and the operationality of the Internet facsimile machine can be improved.

Next, the second embodiment of the present invention will be described with reference to the accompanying drawings.

Second Embodiment

Since the basic control block configuration of the second embodiment is the same as that of the first embodiment, the description will be abbreviated. Moreover, since the example of the electronic mail message of the second embodiment is the same as the one shown in Chart 1 through Chart 4 described in the first embodiment, the description will be abbreviated.

As shown in FIG. 1, the Internet facsimile machine 20 of the second embodiment is a full-mode Internet facsimile machine that stores the original image data in the image data memory field 8a in the memory device 8, and then transmits the image data using electronic mail via the Internet 40. When transmitting the image data, the user declares and designates the original image data holding effective period as the "transient effective period" or the "permanent effective period" by using the operation unit 5. The "transient effective period" of the former has a default effective period (for example, 72 hours) or the designated effective period changed from default by using the operation unit 5. The "permanent effective period" of the latter has a limitless time value as long as the memory device 8, which is an image memory, functions effectively. When the designated effective period elapses (YES in step S151 in FIG. 11), the main control unit 1 controls to transfer the original image data stored in the image data memory field 8a in the memory device 8, which is a nonvolatile storage unit, to store the original image data in the image data memory field 7a of the SRAM 7, which is a volatile storage unit (step S157). Further, when the designated effective period elapses (YES in step S151 in FIG. 11), in the case the image data deletion mode is set (YES in step S152), the original image data stored in the image data memory field 8a in the memory device 8 is deleted (step S153).

According to the second embodiment, in FIG. 1, the ROM 6 stores in advance various software programs that are necessary for the operation of the Internet facsimile machine 20 and that are executed by the main control unit 1. These programs include at least a program of the full-mode Internet facsimile transmission processing shown in FIG. 7 through FIG. 10, and a program of the processing after the elapse of the image data effective period (interruption processing) of FIG. 11. Moreover, the programs can be recorded in a recording medium such as the floppy disk, the MO disk, or the DVD-RAM. The programs can be loaded to the SRAM 7 via the drive device when necessary, and the program can be executed. The SRAM 7 is used as a working area of the main control unit 1, and stores temporally data that generates when the program is executed. The SRAM 7 is backed-up by a battery such as a secondary battery. The memory device 8 includes the image data memory field 8a for storing the image data, and the communication management record table field 8b that is a memory field for recording the communication management record table.

Figure 7:
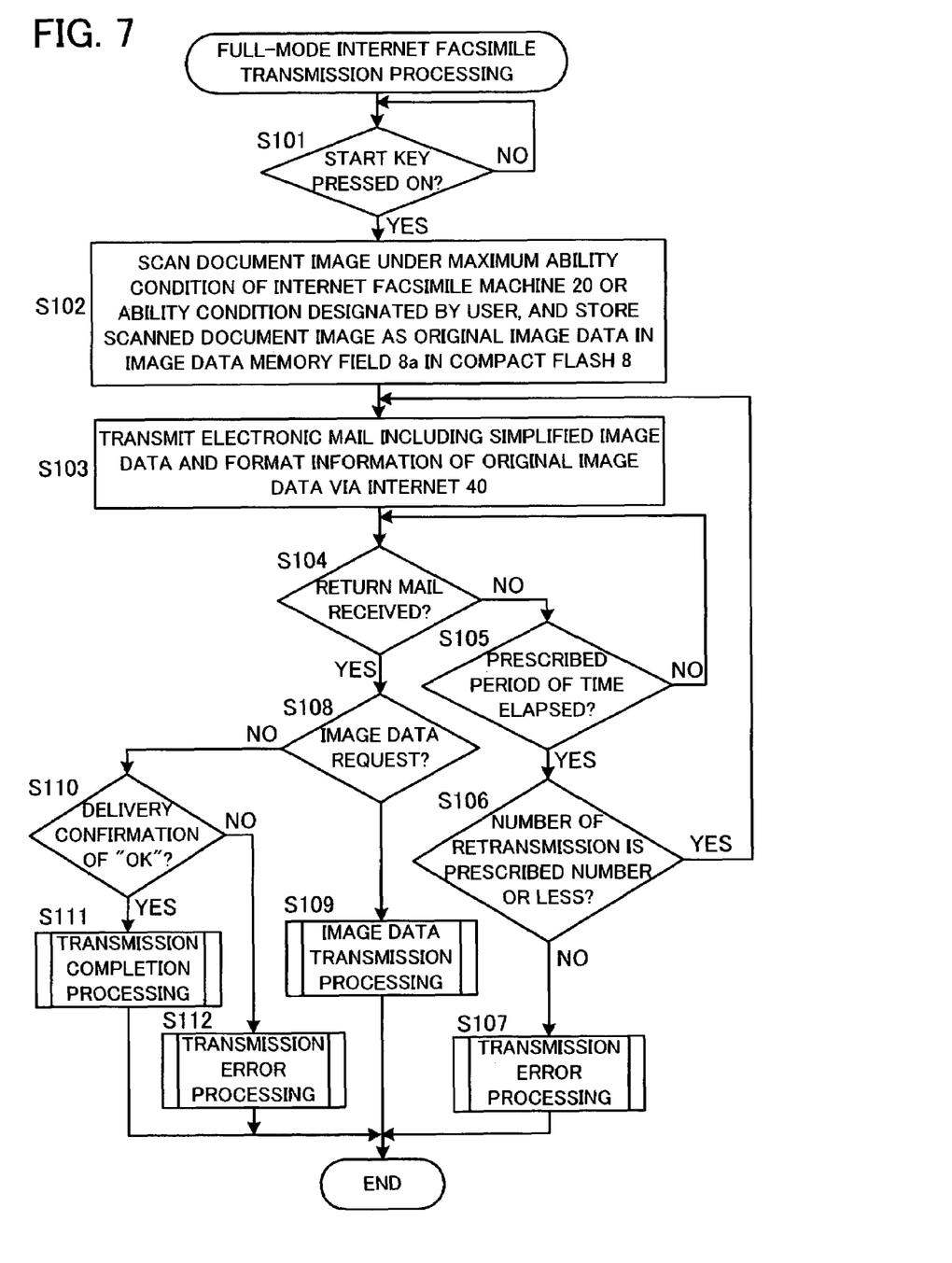
FIG. 7 is a flowchart showing a full-mode Internet facsimile transmission processing to be executed by the main control unit 1 of the Internet facsimile machine 20 of the second embodiment.

FIG. 7 is a flowchart showing the full-mode Internet facsimile transmission processing to be executed by the main control unit 1 of the Internet facsimile machine 20 of FIG. 1.

In step S101 of FIG. 7, it is determined whether or not the start key is pressed ON. When it is determined YES, in step S102, the document image is scanned by Internet facsimile machine 20 under its maximum ability condition or the ability condition designated by the user. In addition, the scanned document image is stored in the image data memory field 8a in the memory device 8 as the original image data. In step S103, the electronic mail message including the simplified image data and the format information of the original image data is transmitted to the receiving Internet facsimile machine via the Internet 40. Next, in step S104, it is determined whether or not the return mail message has been received from the receiving Internet facsimile machine. When it is determined NO, the process proceeds to step S105. When it is determined YES, the process proceeds to step S108. In step S105, it is determined whether or not a prescribed period of time (for example, 30 minutes) has elapsed. When it is determined NO, the process returns to step S104. When it is determined YES, the process proceeds to step S106. Next, in step S106, it is determined whether or not the number of retransmissions have reached a prescribed number (for example, 5 times) or less. When it is determined YES, the process returns to step S103. When it is determined NO, the process proceeds to step S107. After the transmission error processing of FIG. 8 is executed in step S107, the Internet facsimile transmission processing ends.

Figure 9:
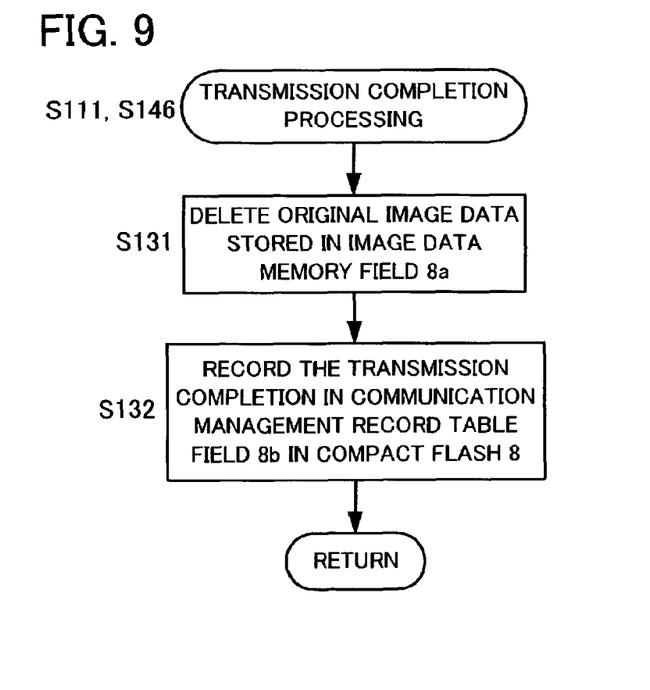
FIG. 9 is a flowchart showing a transmission completion processing (S111, S146) which is a subroutine of FIG. 7 and FIG. 10.
Figure 10:
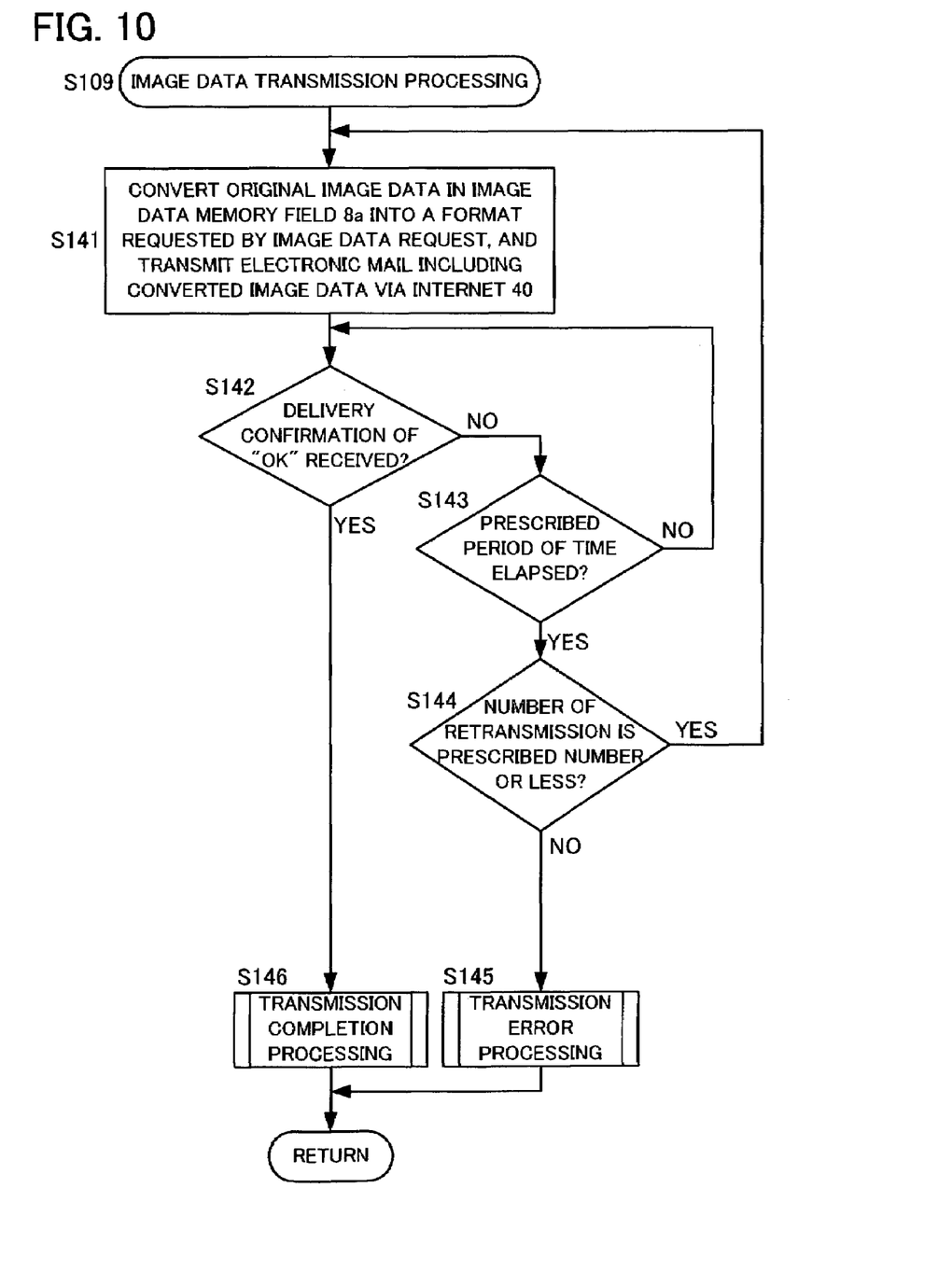
FIG. 10 is a flowchart showing an image data transmission processing (S109) which is a subroutine of FIG. 7.

In step S108, it is determined whether or not it is the image data requested. When it is determined YES, the process proceeds to step S109. When it is determined NO, the process proceeds to step S110. In step S109, the image data transmission processing of FIG. 10 is executed, and the Internet facsimile transmission processing ends. Meanwhile, in step S110, it is determined whether or not it is the delivery confirmation of "OK". When it is determined YES, the process proceeds to step S11. When it is determined NO, the process proceeds to step S112. In step S111, the transmission completion processing of FIG. 9 is executed, and the Internet facsimile transmission processing ends. Meanwhile, in step S112, the transmission error processing of FIG. 8 is executed, and the Internet facsimile transmission processing ends.

Figure 8:
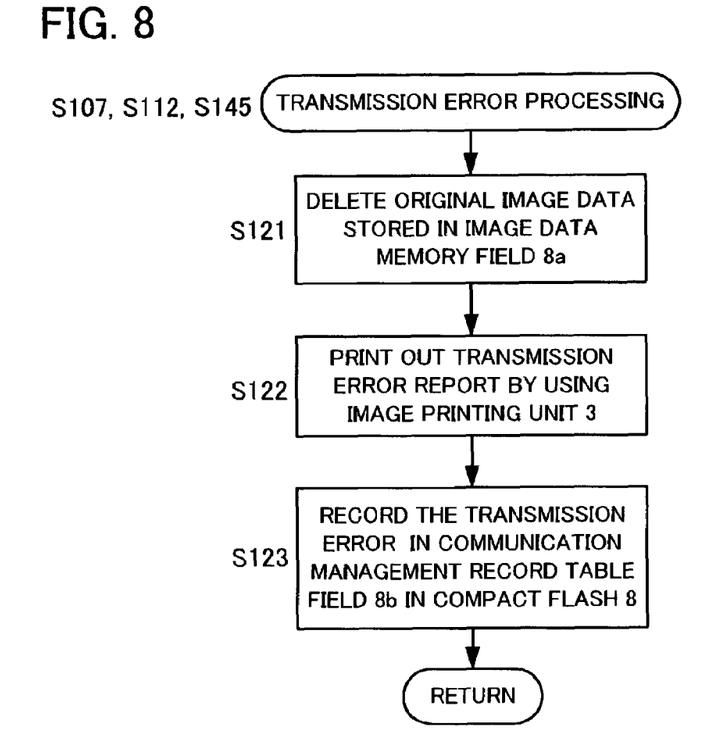
FIG. 8 is a flowchart showing a transmission error processing (S107, S112, S145) which is a subroutine of FIG. 7, FIG. 10, and FIG. 11.

FIG. 8 is a flowchart showing the transmission error processing (S107, S112, S145) which is the subroutine of FIG. 7 and FIG. 10.

In step S121 of FIG. 8, the original image data stored in the image data memory field 8a is deleted. In step S122, when the return mail message cannot be received from the destination, or when receiving the delivery confirmation of "NG", the transmission error report notifying the fact of the deletion of the original image data is printed out by using the image printing unit 3. In step S123, the transmission error is recorded in the communication management record table field 8b in the memory device 8, and the process returns to the original main routine.

FIG. 9 is a flowchart showing the transmission completion processing (S111, S146) which is a subroutine of FIG. 7 and FIG. 10.

In step S131 of FIG. 9, the original image data stored in the image data memory field 8a is deleted. In step S132, the transmission completion is recorded in the communication management record table field 8b in the memory device 8, and the process returns to the original main routine.

FIG. 10 is a flowchart showing the image data transmission processing (S109) which is a subroutine of FIG. 7.

In step S141 of FIG. 10, the original image data in the image data memory field 8a is converted into a format requested by the image data request. The electronic mail message including the converted image data is transmitted to the receiving Internet facsimile machine via the Internet 40. In step S142, it is determined whether or not the delivery confirmation of "OK" is received. When it is determined NO, the process proceeds to step S143. When it is determined YES, the process proceeds to step S146. In step S143, it is determined whether or not a prescribed period of time (for example, 30 minutes) has elapsed. When it is determined NO, the process returns to step S142. When it is determined YES, the process proceeds to step S144. In step S144, it is determined whether or not the number of retransmissions have reached a prescribed number of times (for example, 5 times) or less. When it is determined YES, the process returns to step S141. When it is determined NO, the process proceeds to step S145. In step S145, the transmission error processing of FIG. 8 is executed, and the process returns to the original main routine. Meanwhile, in step S146, the transmission completion processing of FIG. 9 is executed, and the process returns to the original main routine.

Figure 11:
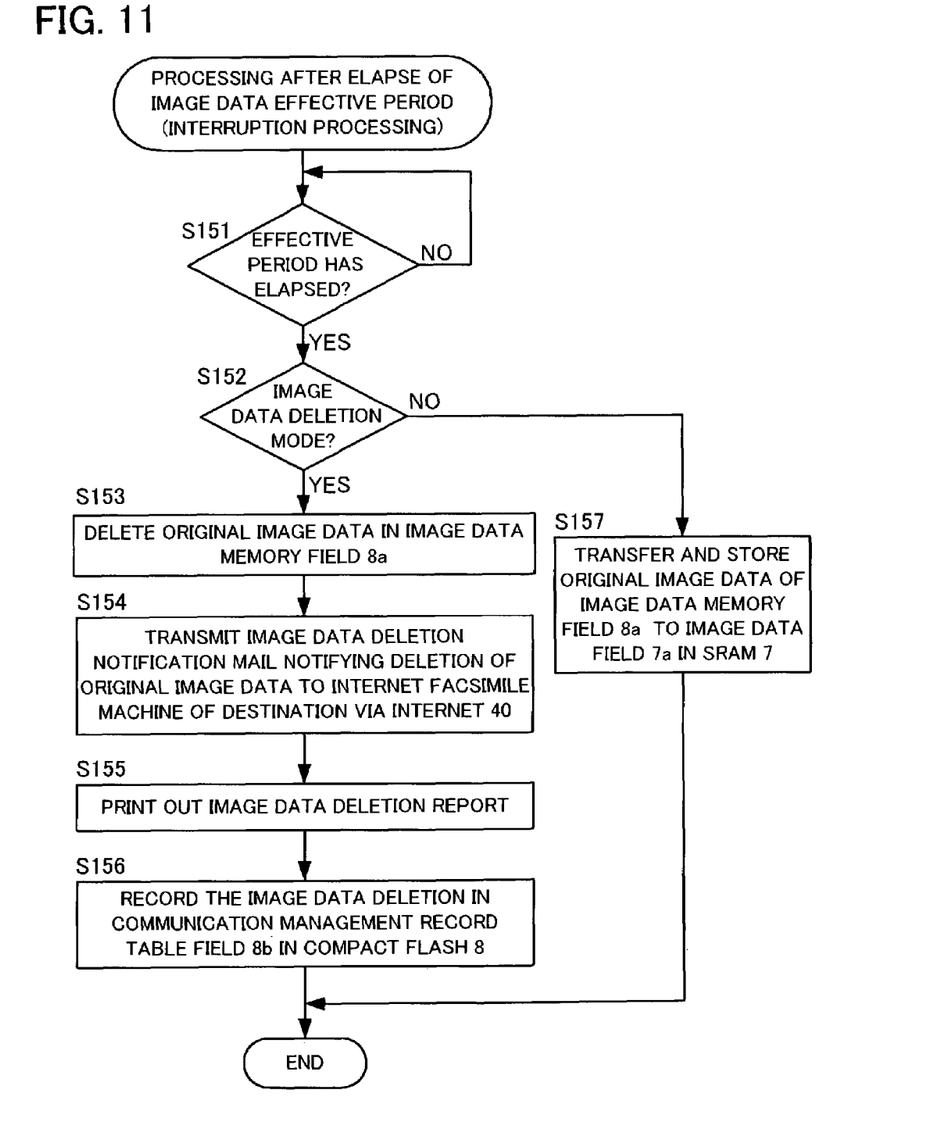
FIG. 11 is a flowchart showing a processing after elapse of image data effective period, which is an interruption processing to be executed by the main control unit 1 of the Internet facsimile machine 20 of the second embodiment.

FIG. 11 is a flowchart showing the processing after the elapse of image data effective period, which is an interruption processing to be executed by the main control unit 1 of the Internet facsimile machine 20 of FIG. 1.

In step S151 of FIG. 11, it is determined whether or not the prescribed effective period for holding the original image data has elapsed. When it is determined YES, in step S152, it is determined whether or not it is the image data deletion mode. When it is determined NO, the process proceeds to step S157. When it is determined YES, the process proceeds to step S153. In step S157, the original image data in the image data memory field 8a is transferred and stored to the image data memory field 7a in the SRAM 7. Then, the processing after the elapse of the image data effective period ends. Meanwhile, in step S153, the original image data in the image data memory field 8a is deleted. In step S154, the image data deletion notification mail notifying of the deletion of the original image data is transmitted to the receiving Internet facsimile machine via the Internet 40. Furthermore, in step S155, the image data deletion report is printed out. In step S156, the image data deletion is recorded in the communication management record table field 8b in the memory device 8, and the processing after the elapse of the image data effective period ends.

The full-mode Internet facsimile machine 20 transmits the simplified image data accompanying the information of the original image data at first. When there is the image data requested from the destination, the full-mode Internet facsimile machine 20 transmits the image data corresponding to the ability condition of the destination. However, since it is necessary for the transmitting Internet facsimile machine 20 to hold the original image data during this period of time, when transmitting the simplified image data at first, the original image data effective period can be designated as either transient or permanent. In either case, it can be assumed that the transmitting Internet facsimile machine 20 has some effective period. In the case the power source is switched off due to power failure of the power source of Internet facsimile machine 20 during a period until receiving the image data requested from the destination or until receiving the delivery confirmation at the transmitting Internet facsimile machine, it is necessary to process the original image data appropriately. Therefore, according to the second embodiment, the original image data within the effective period is stored in the image data memory field 8a in the memory device 8, and after the elapse of the effective period, the original image data is transferred and stored to the image data memory field 7a in the SRAM 7. As a result, the original image data is prevented from occupying the memory device 8 for a long period of time, and it can be prepared for a new transmission and reception processing.

As described above, according to the second embodiment, when transmitting the image data, the user declares and designates the original image data holding effective period as the "transient effective period" or the "permanent effective period" by using the operation unit 5. When the designated effective period elapses (YES in step S151 in FIG. 11), the main control unit 1 controls to transfer and store the original image data stored in the image data memory field 8a in the memory device 8, which is a nonvolatile storage unit, to the image data memory field 7a in the SRAM 7, which is a volatile storage unit (step S157). Therefore, according to the original image data holding effective period, the image memory that holds the original image data can be used effectively for the nonvolatile storage unit and the volatile storage unit.

Variation of Second Embodiment

In the above-described embodiment, an example of the Internet facsimile machine 20 is described. However, the present invention is not limited to this example, and can be applied to the communication terminal device including a telephone set, a data communication device or the like, that is connected to a public network such as the public switched telephone network or the public digital line network.

In the above-described second embodiment, when the return electronic mail message cannot be received even by retransmitting the electronic mail message for a prescribed number of times, the fact that the transmission error has occurred is printed out as a transmission error report (step S122 in FIG. 8). However, the present invention is not limited to this example, and for example, the electronic mail message including the transmission error report can be transmitted to the receiving Internet facsimile machine, or to the Internet facsimile machine monitoring the Internet facsimile machine 20. Therefore, when the return electronic mail message cannot be received even by carrying out the retransmission, since the electronic mail message including the transmission error report is transmitted to the receiving Internet facsimile machine or to the Internet facsimile machine monitoring the Internet facsimile machine 20, the user of these Internet facsimile machines can grasp the condition of the transmitting Internet facsimile machine.

In the above-described second embodiment, the processing after the elapse of the image data effective period of FIG. 11 is executed after the elapse of the effective period. However, the present invention is not limited to this example, and for example, even during the effective period, the processing of step S157, or the processing of the steps S153 through S156 can be executed.

Figure 12:
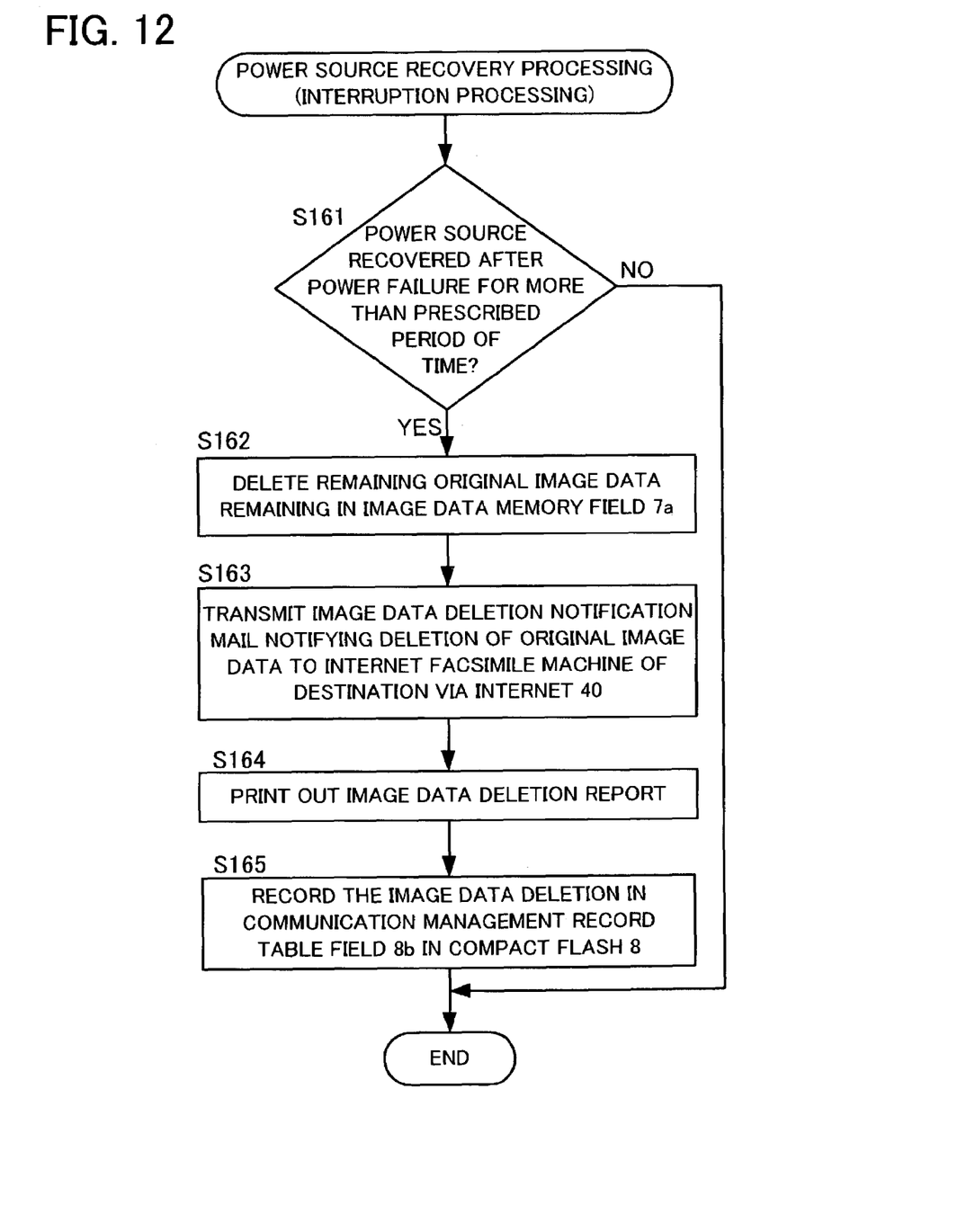
FIG. 12 is a flowchart showing a power source recovery processing according to a variation of the second embodiment, which is an interruption processing to be executed by the main control unit 1 of the Internet facsimile machine 20 of the second embodiment.

FIG. 12 is a flowchart showing a power source recovery processing according to a variation of the second embodiment, which is an interruption processing to be executed by the main control unit 1 of the Internet facsimile machine 20 of FIG. 1. This processing is a processing to be executed after the processing of step S157 is executed. In step S161 of FIG. 12, it is determined whether or not the power source has recovered after the power failure lasting for more than a prescribed period of time. When it is determined YES, the process proceeds to step S162. When it is determined NO, the power source recovery processing ends. Next, in step S162, since there is a possibility for the original image data remaining in the image data memory field 7a no longer being normal data due to an abnormality in the memory data or the like, the original image data remaining in the image data memory field 7a is deleted. Next, in step S163, the image data deletion notification mail notifying the deletion of the original image data is transmitted to the receiving Internet facsimile machine via the Internet 40. In step S164, the image data deletion report is printed out. Then, in step S165, the image data deletion is recorded in the communication management record table field 8*b* in the memory device 8, and the power source recovery processing ends.

According to the power source recovery processing, when the power source of the Internet facsimile machine recovers after the power failure, in consideration to a case in which the data is no longer being accurate data due to an abnormality in the memory data or the like, the transmission error processing is executed. Further, the transmission error processing includes a processing to delete the unnecessary original image data stored in the image data memory field 7*a* of the SRAM 7, which is a volatile storage unit. Therefore, even when the power source of the Internet facsimile machine recovers after the power failure, an appropriate processing can be executed for the original image data stored in the image memory.

Further, as a precondition of the power source recovery processing of FIG. 12, it is assumed as a processing to be executed after the processing of the step S157 is executed. However, the present invention is not limited to this example, and for example, the original image data can be stored in the image data memory field 7*a* in the SRAM 7 when scanning the document image.

Moreover, in the case the original image data holding effective period is declared and designated as the transient effective period or the permanent effective period, when the designated effective period is the transient effective period, the main control unit 1 controls to store the original image data in the image data memory field 7*a* of the SRAM 7, which is a volatile storage unit. When the designated effective period is the permanent effective period, the main control unit 1 controls to store the original image data in the image data memory field 8*a* of the memory device 8, which is a nonvolatile storage unit. Therefore, according to the original image data holding effective period, the image memory for holding the original image data can be used effectively for the nonvolatile storage unit and the volatile storage unit. Moreover, in this case, the image memory for holding the original image data can be used effectively for the nonvolatile storage unit and the volatile storage unit for each facsimile communication or for each destination.

Furthermore, in the case the original image data holding effective period is declared and designated as the transient effective period or the permanent effective period, when the designated effective period is the transient effective period, the main control unit 1 controls to store the original image data in a field that is not backed-up by a battery in the SRAM 7, which is the volatile storage unit. When the designated effective period is the permanent effective period, the main control unit 1 controls to store the original image data in a field that is backed-up by a battery in the SRAM 7, which is the volatile storage unit. Therefore, according to the original image data holding effective period, the image memory for holding the original image data can be used effectively for a field that is backed-up by a battery, and a field that is not backed-up by a battery within the volatile storage unit. In this case, it is effective for when the field not backed-up by the battery in the SRAM 7 is small. Moreover, in this case, the image memory for holding the original image data can be used effectively for a field that is backed-up by the battery and a field that is not backed-up by the battery in the volatile storage unit for each facsimile communication or for each destination.

What is claimed is:

1. A full-mode Internet facsimile machine comprising:
   means for transmitting image data by using an electronic mail message after storing original image data in a means for storing;
   means for declaring and designating an effective period when holding the original image data in the means for storing as a transient effective period or a permanent effective period for each facsimile communication or for each destination; and
   means for controlling to hold the original image data in the means for storing during the designated effective period,
   wherein a boundary threshold between a time value of the transient effective period and a time value of the permanent effective period is set in the means for designating, and the means for designating refers to the boundary threshold and declares and designates the transient effective period or the permanent effective period according to the time value input by a user.

* * * * *